United States Patent [19]

Shirakawa et al.

[11] 4,451,980

[45] Jun. 5, 1984

[54] CHARGEABLE ELECTRIC INSTRUMENT

[75] Inventors: Kenzo Shirakawa; Norio Yamada, both of Hikone; Masami Kitamura, Shiga; Shinsaku Yasunaka; Masao Matsumoto, both of Hikone, all of Japan

[73] Assignee: Matsushita Electric Works, Ltd., Osaka, Japan

[21] Appl. No.: 414,055

[22] Filed: Sep. 2, 1982

[30] Foreign Application Priority Data

Nov. 20, 1981 [JP] Japan ............................ 56-187436
Mar. 10, 1982 [JP] Japan ............................ 57-37799

[51] Int. Cl.³ .................................. B26B 19/38
[52] U.S. Cl. .................................. 30/41; 30/DIG. 1; 320/46
[58] Field of Search ............. 30/DIG. 1, 41, 41.5, 30/41.6; 320/46

[56] References Cited

U.S. PATENT DOCUMENTS

| 3,243,682 | 3/1966 | Gold | 320/46 |
| 3,359,635 | 12/1967 | Jepson | 30/DIG. 1 |
| 3,369,294 | 2/1968 | Shaw | 30/DIG. 1 |
| 4,363,169 | 12/1982 | Nasu et al. | 30/41.5 |
| 4,417,397 | 11/1983 | Kitamura | 30/41.6 |

Primary Examiner—Jimmy C. Peters
Attorney, Agent, or Firm—Burns, Doane, Swecker & Mathis

[57] ABSTRACT

Chargeable electric instrument of watertight housing capable of still discharging abnormally generated gas or liquid from built-in storage battery. The instrument includes a gas discharging valve means provided at an open end of a storage-battery casing, a cap means fixed to the casing for liquid-tightly enclosing the open end and valve means, a charge current feeding means provided in an end part of the housing, and a gas or liquid flow-path means made through the cap means and housing while preventing an entry of any fluid from the exterior, whereby any explosive gas internally generated can be effectively discharged through the valve, cap and flow-path means to the exterior.

10 Claims, 11 Drawing Figures

CHARGEABLE ELECTRIC INSTRUMENT

This invention relates to watertight and chargeable electric instruments having a built-in storage battery and, more particularly, to a chargeable electric instrument wherein a gas or liquid abnormally generated from the storage battery in the instrument can be smoothly discharged while maintaining sufficient watertight function.

In the chargeable electric instruments of the kind referred to, such abnormal charging as overcharging, reverse charging or the like in the case of quick charging or a charging under a condition of a very low temperature or the like will result in a generation of large amounts of hydrogen and oxygen at a ratio of 2:1 within the storage battery, in the same state as a water electrolysis. In such instruments, on the other hand, it is often desirable to provide a watertight structure in instrument housing for the purpose of maintaining inherent function of the instrument or cleaning the housing. In such case, a valve acting only in the direction of discharging the gas or the like is generally provided in a part of watertight structural members so as to discharge the gas or like having reached a fixed pressure. In such measure, however, there has been a problem that, if its discharging function is insufficient, the gases may happen to explode with a contact arc of a switch of the instrument or a commutator arc of a motor, resulting in a damage of the instrument or even in an injury of the user. The present invention has been suggested to remove such problem.

A primary object of the present invention is, therefore, to provide a chargeable electric instrument of watertight structure which is capable of smoothly discharging the gas abnormally generated and accumulated within the instrument to eliminate any risk of an explosion or the like of the gas, while maintaining desired watertight function of the instrument reliably.

Another object of the present invention is to provide a watertight and chargeable electric instrument which can smoothly discharge water produced by the recombination of hydrogen and oxygen abnormally generated in the instrument, simultaneously with the discharging of such gases.

Still another object of the present invention is to provide a chargeable electric instrument of watertight type which can effectively smoothly discharge out of the instrument any gas produced during a charging of the storage battery in the instrument, simultaneously with the generation.

A further object of the present invention is to provide a chargeable and watertight electric instrument wherein, even when a discharging path for abnormally produced gas or the like is partly clogged with dust or the like, the gas or the like can be smoothly discharged out of the instrument.

Other objects and advantages of the present invention shall be made clear in the following description of the invention detailed with reference to preferred embodiments shown in accompanying drawings, in which:

FIGS. 6 through 11 are respectively a sectioned view similar to FIG. 4 but showing each of still further embodiments of the present invention as applied also to the chargeable electric shaver, wherein

While the present invention shall be explained in the followings with reference to the embodiments shown in the accompanying drawings, the intention is not to limit the invention only to these embodiments but to rather include all modifications, alterations and equivalent arrangements possible within the scope of appended claims.

Figure 1:
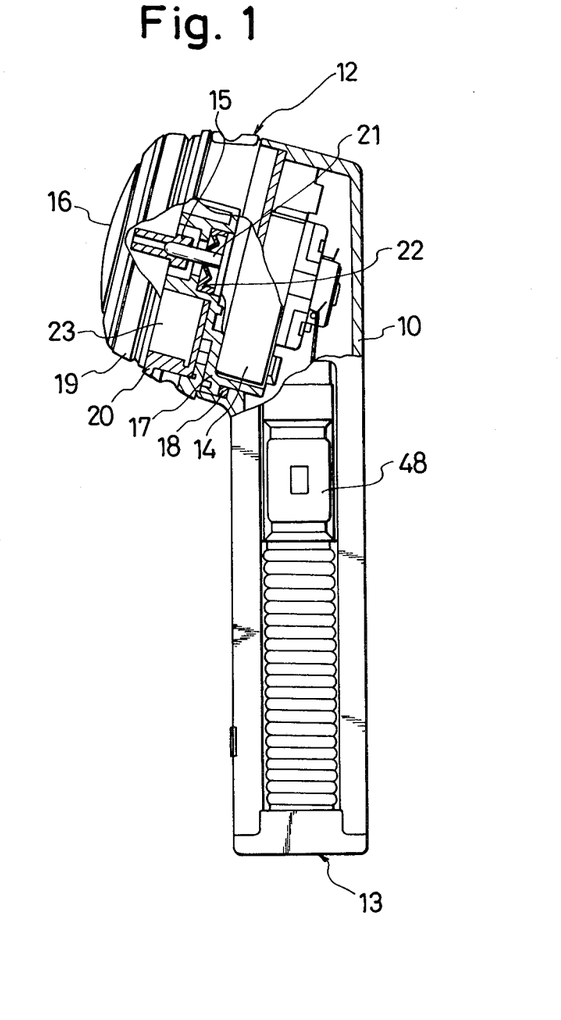
FIG. 1 is a partly sectioned side view of a chargeable electric shaver to which the present invention is applied as a practical aspect.
Figure 2:
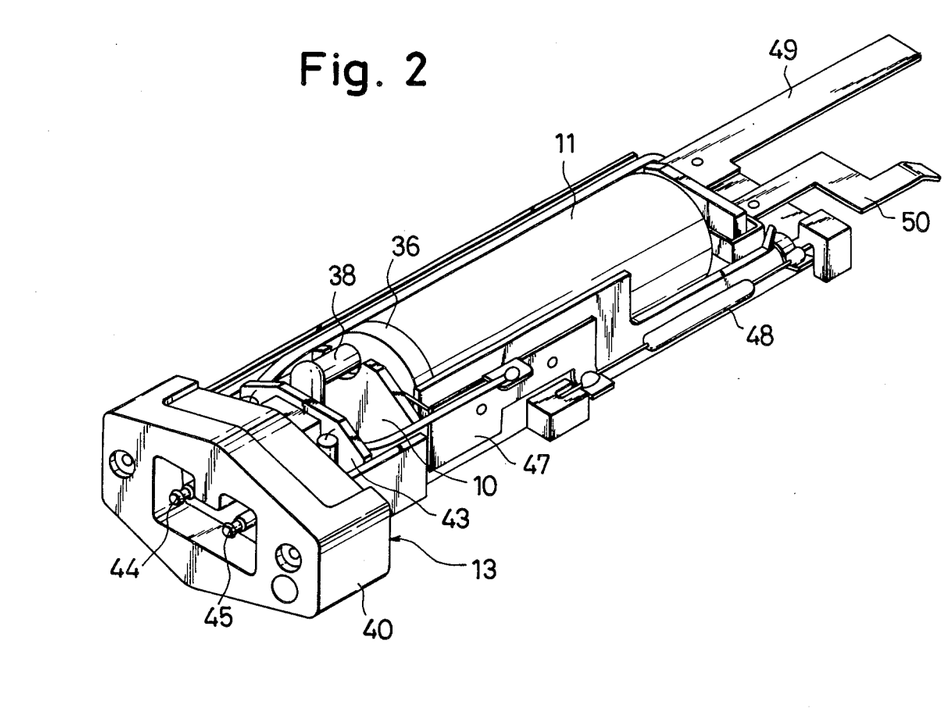
FIG. 2 is a perspective view of a lower part of the chargeable electric shaver shown in FIG. 1 with a casing of the shaver removed.
Figure 3:
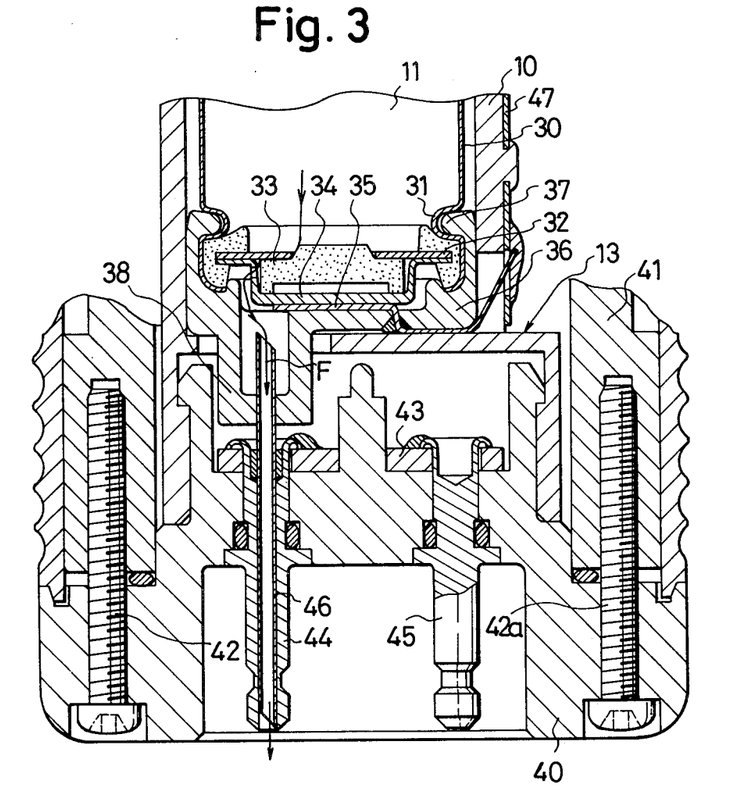
FIG. 3 is a fragmentary sectioned view as magnified of the lower end part of the chargeable electric shaver of FIG. 1, showing an embodiment of the present invention.

Referring now to FIGS. 1 to 3, a chargeable electric shaver to which the present invention is applied simply as an example comprises a casing 10 of watertight structure and housing therein a storage battery 11 and at least main components of the shaver. A shaving head part 12 is mounted to the upper part of the casing 10 to be powered by the battery 11 intermediately positioned in the casing, and a battery charging part 13 is provided in the lower part of the casing. In the shaving head part 12, an inner blade base 15 is provided to support a well known inner blade assembly for its rotation on the inner surface of an outer blade 16 as driven by a motor 14 secured to an upper opening of the casing and connected to the storage battery 11. In this case, a holding frame 17 for the motor 14 is liquid-tightly fixed to the casing 10 through an O-ring 18 and a flushing ring 20 is axially rotatably fitted between the holding frame 17 and an outer blade frame 19 holding the outer blade 16. A driving shaft 21 of the motor 14 is passed through the central part of the flushing ring 20 and is connected to the inner blade base 15. A liquid-tight bush 22 is provided so as to liquid-tightly enclose the driving shaft 21. Therefore, the shaving head part 12 can be liquid-tightly held by the O-ring 18 and liquid-tight bush 22 to the casing 10 and, as through holes made in the peripheral part of the flushing ring 20 are aligned with corresponding holes made in the peripheral part at the lower portion of the outer blade frame 19 and the shaving head part is subjected to a water flow, the shaving head part can be washed by water, hair shaven and retained in a hair reservoir 23 defined within the flushing ring 20 can be swept without influencing the components inside the casing 10.

According to an aspect of the present invention, there is provided a discharging path for effectively discharging out of the instrument the internally generated gases through the lower part of the casing. More specifically, an annular groove 31 is formed to project inward in the lower end part of a tubular casing 30 for the storage battery 11 housed in the casing 10, a sealing plate 32 is provided to seal the lower end opening of the battery casing 30 as embraced between the inner surface of the respective opposing inner wall surfaces of the groove 31 and an inward projected lower end edge of the casing 30, and a resilient valve member 33 is provided to externally abut against the sealing plate 32 and to normally close its central hole liquid-tightly but to allow the internally generated gas to be discharged out of the tubular casing 30. Further, a pan-shaped anode terminal plate 34 is secured further externally to the sealing plate 32 so as to enclose the valve member 33 while extending downward, and an anode terminal 35 is secured at an end flatly to the bottom of the anode terminal plate 34. A liquid-tight cap 36 made of an elastic material and having an inward projected flange 37 at the upper opening is fitted inside the lower end opening of the casing 10, with the flange 37 engaged in the annular groove 31 of the battery casing 30. The cap 36 is provided with a downward projection 38 axially opened for gas discharging and with a slit for liquid-tightly leading out the anode terminal 35.

In the present instance, further, a bottom lid 40 to be fitted to the lower end opening of the battery casing 10 and forming a part of this casing 10 is provided as liquid-tightly secured by means of screws 42 and 42a, through an O-ring, to the bottom end opening of an outer housing 41 in which the battery casing 10 is housed. Further, a printed circuit board 43 having a power charging circuit to be connected to the storage battery 11 in any known manner is secured to the inner surface of the bottom lid 40, charging-current feeding pins 44 and 45 liquid-tightly passed through the bottom lid 40 with O-rings interposed are electrically connected and soldered at the upper end edges to the printed circuit board 43, and the feeding pin 44 is provided to be hollow and has a ventilating tube 46 liquid-tightly inserted through the pin. The ventilating tube 46 has such inside diameter that can prevent a fluid or dust from entering in the tube from outside, while being diagonally cut at both ends, and is extended upward to be liquid-tightly inserted through the opening of the projection 38 of the cap 36. The projection 38 may not be preliminarily opened axially, and the diagonally cut upper end of the tube 46 may simply be thrust through the closed bottom of the projection 38. The battery casing 30 is made to act as a cathod of the storage battery 11 and the anode terminal 34 is connected to a connector 47 which is secured along the outer wall of the casing 10 and connected to a switch 48 consisting, for example, of a lead switch and permanent magnet. Terminals 49 and 50 for connecting the battery 11 and switch 48 to the motor 14 are extended out of the casing 10 above the battery 11.

In the electric shaver of FIGS. 1 to 3, in particular, the periphery of the battery casing 10 is substantially perfectly liquid-tightly sealed from the exterior so as to allow the shaving head part to be washable with water. On the other hand, the internally generated gas from the storage battery 11 is allowed to be discharged out in such that the gas will slightly depress the valve 33 at its central part positioned in the central hole of the sealing plate 32, so as to flow through the valve 33 into the liquid-tight cap 36 through a gas venting hole made properly in the anode terminal plate 34 and further into the ventilating tube 46 which is passed through the current feeding pin 44, to be discharged therethrough to the exterior. In this case, as the ventilating tube 46 is of such inside diameter that allows the gas to flow out but prevent a fluid or the like from flowing in and is diagonally cut at both ends to render their opening rate to be still larger while minimizing the capillarity, the current feeding pin 44 exposed to the exterior at the outermost end surface can be effectively utilized to vent the gas while maintaining the watertight function. It is also preferable to form the ventilating tube 46 with a corrosion-proof or rust-proof material.

Figure 4:
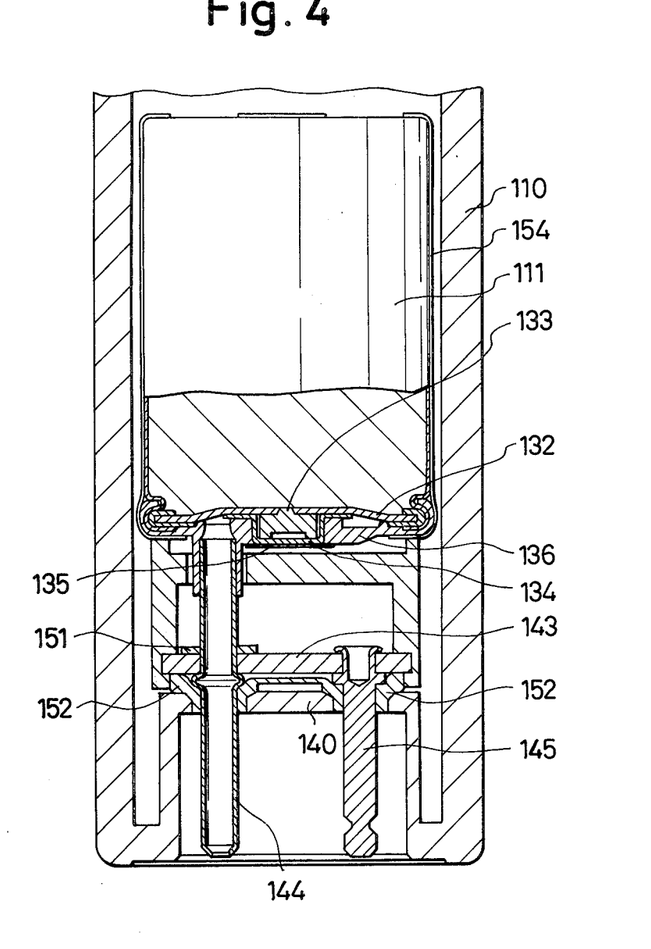
FIG. 4 is a fragmentary sectioned view as magnified of the lower end part of another example of the chargeable electric shaver to which the present invention is applied as another practical aspect.
Figure 5:
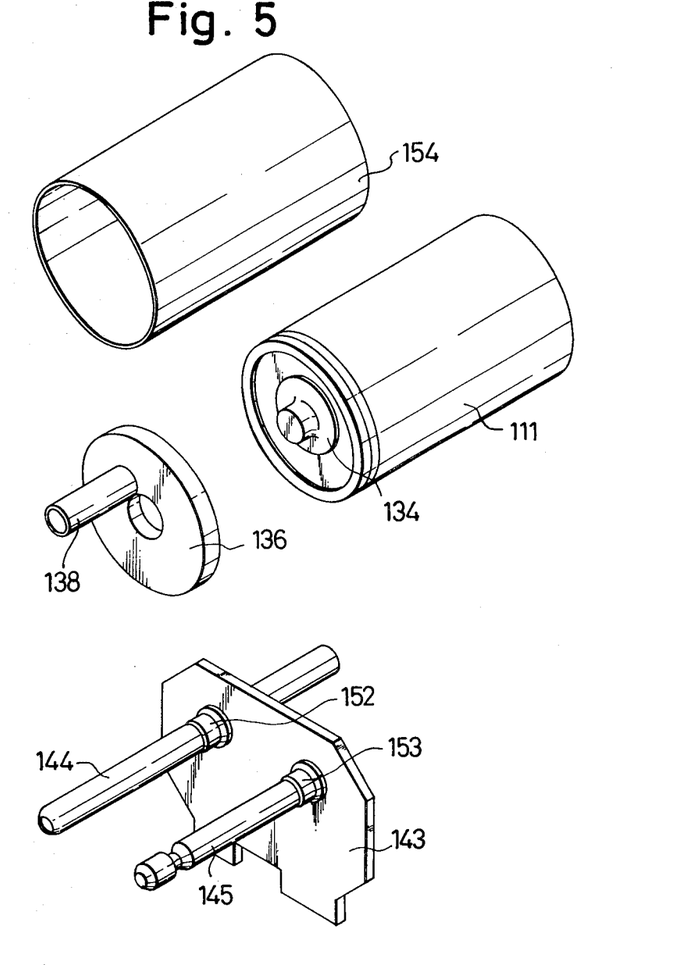
FIG. 5 is a perspective view as disassembled of the lower end part of the chargeable electric shaver shown in FIG. 4, with a casing removed.

According to another aspect of the present invention, the current feeding pin itself can be utilized directly as a ventilating means. Referring to FIGS. 4 and 5 showing another embodiment, the same members as those in the foregoing embodiment of FIGS. 1 to 3 are shown by adding 100 to the reference numerals given to such members. In this embodiment, a current feeding pin 144 is made of a hollow metal tube, which is liquid-tightly coupled at the upper end directly to a discharging projection 138 of a liquid-tight cap 136 and electrically connected with a printed circuit on a board 143 by means of a connecting nut 151 so as not to be squeezed by heat of soldering. The current feeding pins 144 and 145 are held sufficiently liquid-tightly through an elastic packing 152 to a bottom plate 140 recessed from the bottom end of the casing 110. On the other hand, the storage battery 111 is covered with an insulating tube 154 of a heat-shrinkable material so that an end of the tube will reach over the liquid-tight cap 136 to strengthen the liquid-tightness and insulation. Further, in the same manner as in the foregoing embodiment of FIGS. 1 to 3, the gas from the battery will flow into the liquid-tight cap out of the central hole of a sealing plate 132 and further out of the current feeding pin 144. In this case, the inside diameter of the pin 144 is also made to allow the gas to flow out but not to allow a fluid to enter from the exterior. Other arrangements and operations are substantially the same as in the embodiment of FIGS. 1 to 3, except that the casing 110 is made to form the outer housing and has no separate bottom lid.

Figure 6:
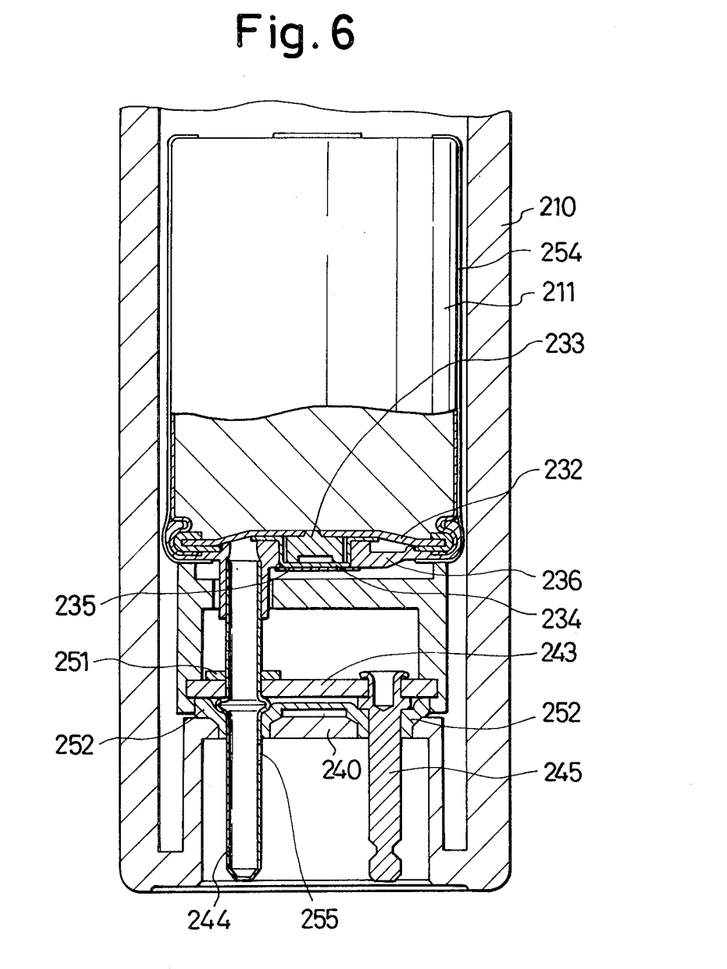

According to a further aspect of the present invention, the current feeding pin acting as the ventilating tube is so formed that the gas can be smoothly vented even when it is clogged at the tip. Referring to FIG. 6 showing an embodiment to this aspect, the same members as those in FIGS. 4 and 5 are shown by adding further 100 to the reference numerals for these members. In the present embodiment, as gas venting hole 255 is made in a hollow current feeding pin 244 at a position close to a bottom plate 240 recessed from the bottom end of a casing 210, through which the pin 244 extending downward, so that, even if the current feeding pin 244 is clogged at the tip, the gas having flowed into the current feeding pin 244 can be discharged out of the venting hole 255 without being reversed. The positioning of the venting hole 255 assures that, even when a part of such charging equipment as A.C.-to-D.C. converter is tightly fitted to the current feeding pins 244 and 255, the smooth gas discharge can be achieved. Other arrangements and operations are substantially the same as in the embodiment of FIG. 4.

Figure 7:
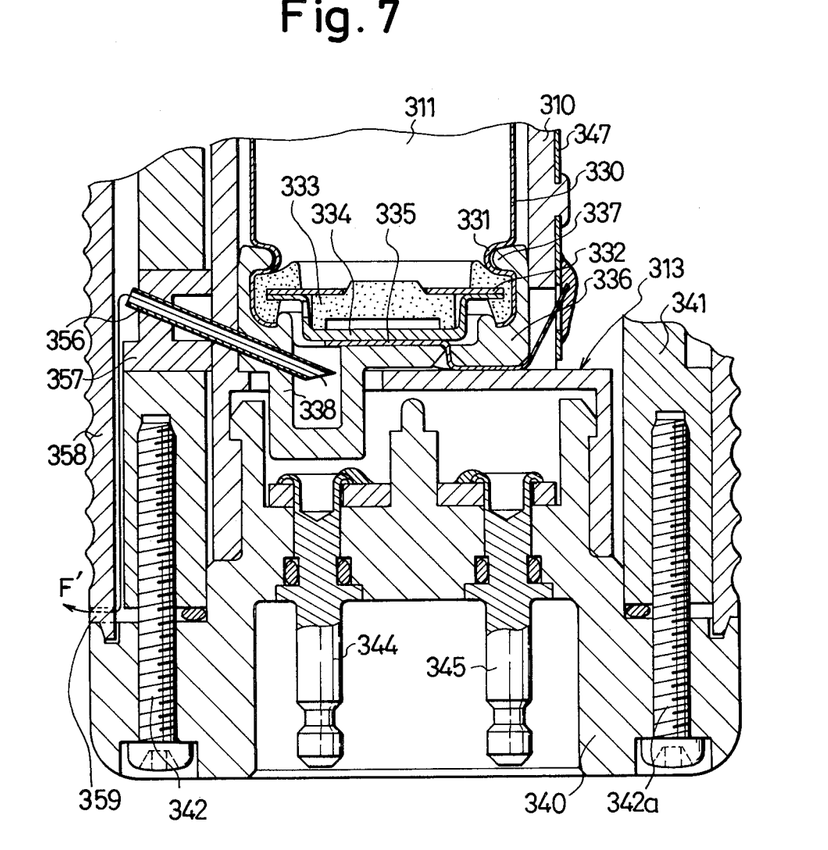

In a still further aspect of the present invention, the gas having reached the liquid-tight cap can be discharged out of the instrument without utilizing the current feeding pin. Referring to FIG. 7 showing an embodiment of this aspect, the same members as those in the embodiment of FIGS. 1 to 3 are shown by adding 300 to the reference numerals for such members. In the present instance, a ventilating tube 356 thrust liquid-tightly at one end into a discharging projection 338 of a liquid-tight cap 336 is passed at the other end through a liquid-tight packing 357 provided through a wall of a housing 341 which enclosing a battery casing 310 to be led out of the housing so as to allow the gas to be discharged out of the housing. Further in the present instance, as shown by the arrow F', the gas will be discharged out of the instrument through a hole 359 made in a side plate 358 attached to the housing 341. Other arrangements and operations are substantially the sme as in the embodiment of FIGS. 1 to 3.

Figure 8:
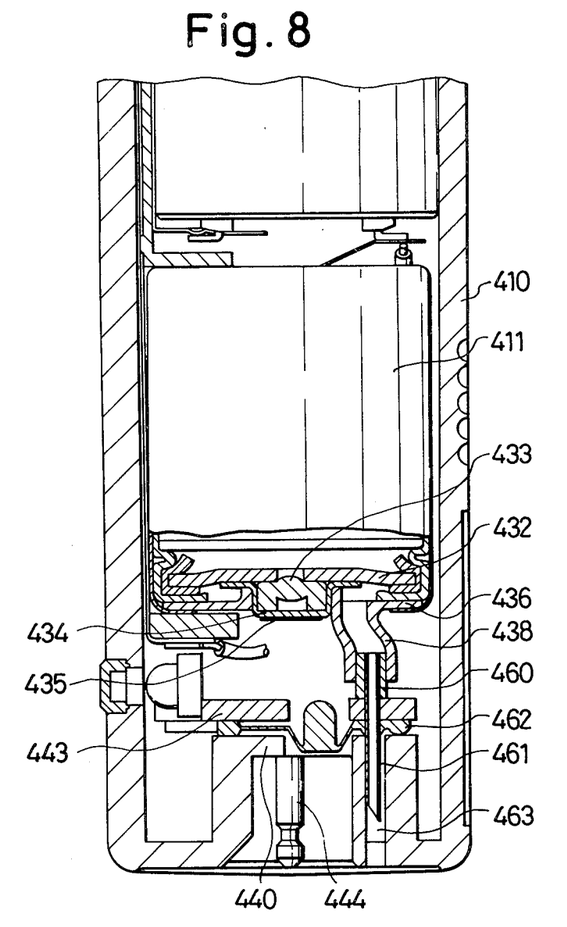

FIG. 8 shows another embodiment of the case where the current feeding pin is also not utilized for the gas discharge, in which substantially the same members as those in the embodiment of FIGS. 1 to 3 are shown by adding 400 to the reference numerals for such members. In this embodiment, a ventilating tube 461 is liquid-tightly connected through a sleeve 460 to a discharging projection 438 of a liquid-tight cap 436 and is extended downward through a printed circuit board 443 and resilient packing 462, the latter being held between the board 443 and a bottom plate 440 of a casing 410, so as to be thrust at downward extended end into a discharging path 463 formed in the bottom plate 440. Accordingly, the gas having reached the liquid-tight cap 436 will be discharged out of the instrument through the ventilating tube 461 and discharging path 463. While in the drawing only one current feeding pin is shown, it will be easily understood by any skilled in the art that the other current feeding pin is arranged behind the one shown in the illustration of the drawing. Other arrangements and operations are substantially the same as in the respective foregoing embodiments.

Figure 9:
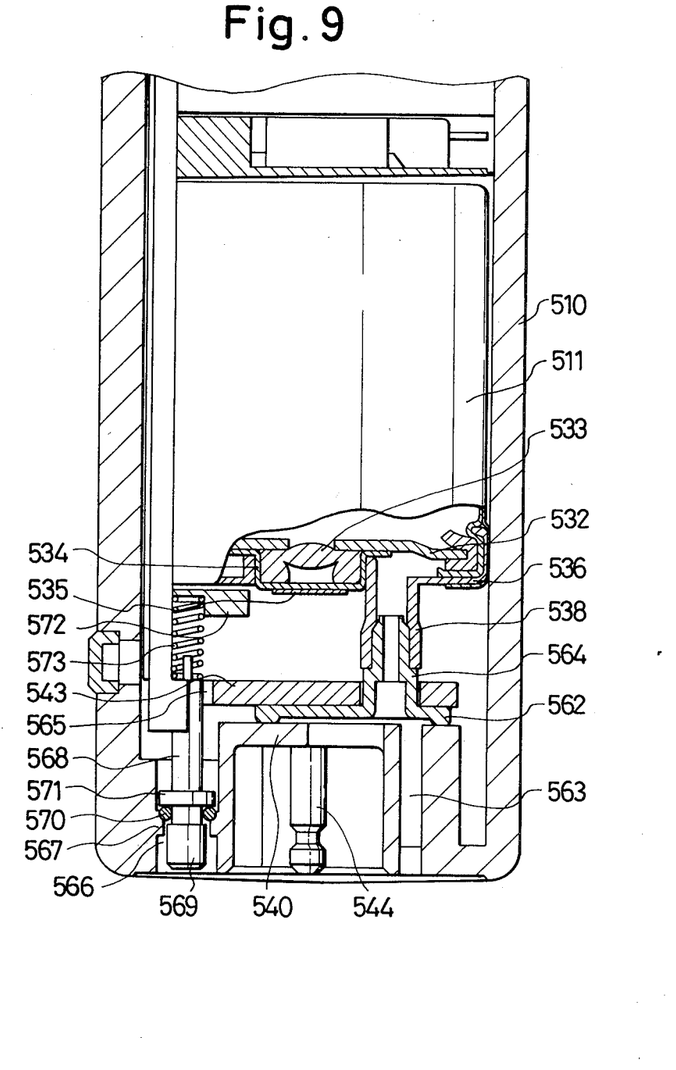
Figure 10:
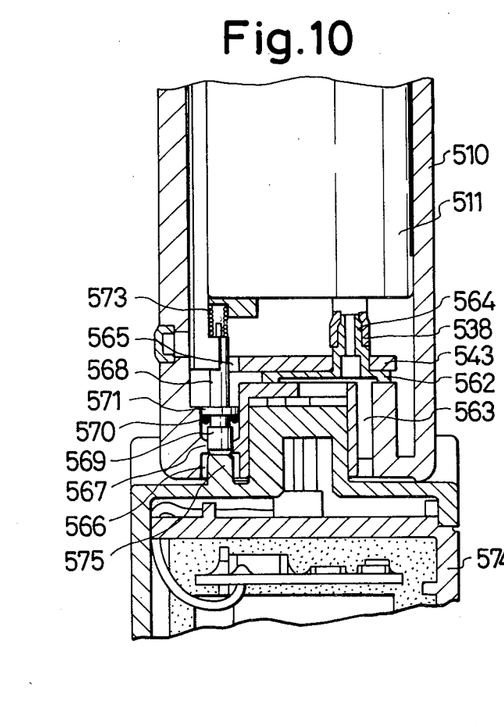
FIG. 10 shows a state in which the shaver of FIG. 9 is mounted to a source power converter for charging the battery in the shaver.

In a further aspect of the present invention, two gas discharging paths are formed, one of which is formed to be opened only at the time of the battery charging. Referring to FIGS. 9 and 10 showing an embodiment of such aspect, the substantially same members as those in the embodiment of FIG. 8 are shown with reference numerals made respectively by adding 100 to the reference numerals for them in FIG. 8. In the present instance, a hollow flow-path projection 564 erected on an elastic spacer 562 inserted between a printed circuit board 543 and a bottom plate 540 of a casing 510 is connected to a discharging projection 538 of a liquid-tight cap 536. The flow path of this flow-path projection 564 is provided to be able to communicate with a discharging path 563 formed in the bottom plate 540.

On the other hand, another discharging path 566 that can communicate with a hole 565 in the printed circuit board 543 is made in the other part of the bottom plate 540. In the discharging path 566, a valve seat 567 is provided and a valve rod 568 is loosely fitted axially slidably in the path to advance and retreat. The rod 568 has a valve head 569 at an end and a pressing flange 571 laterally projected to an extent larger than the diameter of an O-ring 570 fitted between the pressing flange 571 and the valve head 569 inside the seat 567. A coil spring 573 is engaged at one end to an internally provided arm 572 of the casing 510 and at the other end to the top end of the valve rod 568, whereby the O-ring 570 is normally urged resiliently against the valve seat 567 by the pressing flange 571.

Now, in the case when, for example, the discharging path 563 is clogged with dust or the like, the gas reaches the other discharging path through the hole 565 of the printed circuit board 543. When a battery charging means 574 is fitted to the current feeding pins and a pushing-up projection 575 provided on the upper surface of the means 574 is thrust into the lower part of the other discharging path 566, as in FIG. 10, the valve head 569 is pushed up, the valve rod 568 is thereby shifted up, the force of the spring 573 imparted through the pressing flange 571 to the O-ring 570 will no longer act, the O-ring 570 separates from the valve seat 567 to open the path, and the gas can by smoothly discharged. If, in this embodiment, the inside diameter of the flow-path projection 564 is made small enough to pass only the gas, any fluid entering through one of the discharging paths will not enter beyond the elastic spacer 562 and, as the other discharging path 566 is normally closed, there will be no risk of allowing the liquid to enter. It is preferable that the inside diameter of the other discharging path 566 is made considerably larger than the outside diameter of the pushing-up projection 575 of the charging means 574 so that, upon the pushing-up operation of the projection 575, dust will be prevented from being urged to enter into the discharging path 566. Other arrangements and operations are the same as in the respective foregoing embodiments.

Figure 11:
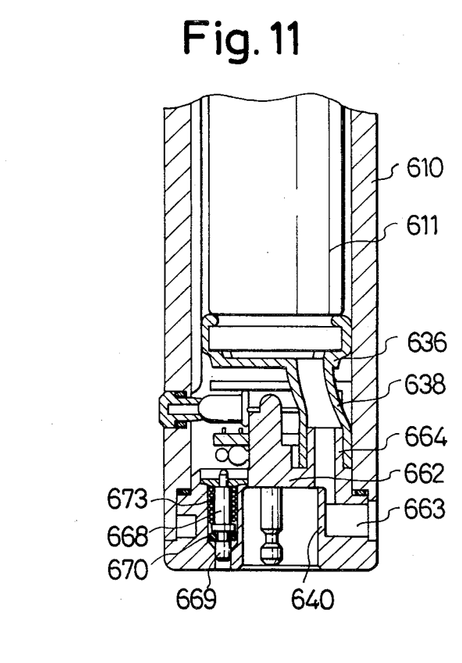

FIG. 11 shows a modification of the embodiment shown in FIGS. 9 and 10, which is of substantially the same arrangement except that a bottom lid is attached to the lower part of the casing. The substantially same members as those in the embodiment of FIGS. 9 and 10 are shown by adding 100 to the reference numerals for such members. In this embodiment, a discharging path 663 communicating with a flow path within a flow-path projection 664 of an elastic spacer 662 is formed to open on the side surface of a bottom lid 640 fitted to the lower end of the casing 610. Therefore, even if the charging means is tightly fitted to the lower end surface of the bottom lid 640, the gas can be discharged smoothly through the sideward open path 663. Other arrangements and operations are the same as in the embodiment of FIGS. 9 and 10.

While in the above descriptions only the electric shaver has been referred to as the chargeable electric instrument to which the present invention is applied, it should be appreciated that the present invention is similarly applicable to such other instruments as, for example, electric tooth brushes, electric hair cutters, such small electric lighting instruments as flashlights or torches and so on, which having substantially the same function as the shaver so long as they are rechargeably battery powered. The invention can be further variously modified in such that, for example, the both embodiments of FIGS. 1 to 3 and FIG. 7 may be used together, and the specific arrangement of FIGS. 9 and 10 may be simultaneously provided in the respective embodiments of FIGS. 1 to 3, FIG. 4, FIG. 5 and FIG. 6.

According to the present invention of such arrangements as has been described above, the gas generated inside the chargeable electric instrument can be effectively discharged through a predetermined discharging path out of the instrument, so that any risk of the gas explosion as ignited by a spark in a built-in motor or the like can be removed, a sufficient durability of the instrument can be retained and its safety can be greatly elevated. It will be also evident for any skilled in the art that these effects can be further promoted by adopting an arrangement that can discharge the gas positively during the power charging operation in which the gas is produced.

What is claimed as our invention is:
1. A chargeable electric instrument comprising:
a housing,
a battery casing disposed in said housing and having a closed end and an open end, a chargeable storage battery disposed in said casing, electric component parts powered by said battery, means for feeding an electric charging current to said battery, a valve arranged to clos-off said open end of said casing in a liquid-tight manner, said valve including a normally-closed gas-discharge opening means for discharging, from said casing, gas generated therein by said battery, said opening means being openable in response to a predetermined gas pressure within said casing to discharge the gas, and gas conducting means for communicating said opening means with the exterior of said housing to discharge the gas to the exterior of said housing, said gas conducting means including diffusion preventing means encompassing said valve and said open end of said casing to prevent gas from collecting between said housing and the exterior of said casing.

2. An instrument according to claim 1, wherein said diffusion preventing means includes an elastic cap member having a portion interposed between said housing and the exterior of said casing, an anode terminal member connected at one end to the anode of said storage battery, said anode terminal member extending at the other end liquid-tightly out of said cap member.

3. A chargeable electric instrument comprising a chargeable storage battery, discharging means for discharging out of said instrument any gas generated therein, electric component parts powered by the battery, a housing for liquid-tightly enclosing therein said battery and said component parts, means provided to the casing for feeding a charging source current to the battery, and communicating means for communicating said discharging means to the exterior of the casing so as to allow said gas discharged from the discharging means to the exterior, a battery casing enclosing therein said storage battery and opened at one end, said discharging means being provided to normally close said open end of said battery casing and to be caused to open when said gas reaches a predetermined pressure level, and diffusion-preventing means liquid-tightly enclosing the open end of the battery casing and valve member for preventing the gas discharged from said discharging means from diffusing inside the instrument, said current feeding means being liquid-tightly fitted inside said housing and comprising a pair of current-feeding pins which are connected to a charging circuit connected to said storage battery, one of said pins being made hollow and forming at least a part of said communicating means.

4. An instrument according to claim 3, wherein said communicatiing means comprises a ventilating tube reaching at one end the interior of said housing and passed through said hollow current feeding pin, said tube being diagonally cut at least at the other end to enlarge the endwise opening rate of the tube.

5. An instrument according to claim 4, wherein said pair of current feeding pins are extended to a recess formed in an end part of said housing for receiving therein a separate charging means, and said hollow current feeding pin is provided with a laterally opened hole in the part extended to said recess.

6. An instrument according to claim 5, wherein said communicating means is arranged to be opened in response to a separate charging means being fitted to said housing.

7. An instrument according to claim 6, wherein said communicating means is a flow path formed in said housing and provided therein with a valve means for opening and closing said path in response to the separate charging means being fitted to said housing.

8. An instrument according to claim 7, wherein a valve seat is provided in said flow path, and said valve means comprises a valve rod carrying a sealing member and resiliently biased to depress said sealing member against said valve seat.

9. A chargeable electric instrument comprising a chargeable storage battery, discharging means for discharging out of said instrument any gas generated therein, electric component parts powered by the battery, a housing for liquid-tightly enclosing therein said battery and said component parts, means provided to the casing for feeding a charging source current to the battery, and communicating means for communicating said discharging means to the exterior of the casing so as to allow said gas discharged from the discharging means to the exterior, a battery casing enclosing therein said storage battery and opened at one end, said discharging means being provided to normally close said open end of said battery casing and to be caused to open when said gas reaches a predetermined pressure level, and diffusion preventing means liquid-tightly enclosing the open end of the battery casing and valve member for preventing the gas discharged from said discharging means from diffusing inside the instrument, said communicating means comprising first and second flow paths opening toward the exterior of said housing, said first flow path being communicated at least to an opening made in said diffusion preventing means, and said second flow path being provided at an end of said housing and arranged to be opened in response to a separate charging means is fitted to said end of the housing.

10. An instrument according to claim 9, wherein said first flow path being provided to open through a side wall adjacent said end of said housing.

* * * * *